United States Patent
Gladigau et al.

(10) Patent No.: US 10,503,666 B2
(45) Date of Patent: Dec. 10, 2019

(54) METHOD FOR OPERATING A MICROCONTROLLER

(71) Applicant: Robert Bosch GmbH, Stuttgart (DE)

(72) Inventors: Jens Gladigau, Renningen (DE); Simon Hufnagel, Herrieden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/775,239

(22) PCT Filed: Nov. 7, 2016

(86) PCT No.: PCT/EP2016/076788
§ 371 (c)(1),
(2) Date: May 10, 2018

(87) PCT Pub. No.: WO2017/089101
PCT Pub. Date: Jun. 1, 2017

(65) Prior Publication Data
US 2018/0322072 A1 Nov. 8, 2018

(30) Foreign Application Priority Data

Nov. 25, 2015 (DE) .................. 10 2015 223 335

(51) Int. Cl.
*G06F 12/14* (2006.01)
*G06F 21/79* (2013.01)

(52) U.S. Cl.
CPC ...... *G06F 12/1483* (2013.01); *G06F 12/1441* (2013.01); *G06F 12/1491* (2013.01);
(Continued)

(58) Field of Classification Search
CPC ............ G06F 12/1441; G06F 12/1458; G06F 12/1483; G06F 12/1491; G06F 21/79; G06F 2221/2141; G06F 2221/2149
(Continued)

(56) References Cited

U.S. PATENT DOCUMENTS 5,515,525 A  5/1996 Grynberg et al.
8,572,345 B2 * 10/2013 Moyer ................ G06F 12/1483
                                                 711/152
(Continued)

FOREIGN PATENT DOCUMENTS

WO  2015074512 A1  5/2015

OTHER PUBLICATIONS

International Search Report dated Feb. 24, 2017 of the corresponding International Application PCT/EP2016/076788 filed Nov. 7, 2016.

*Primary Examiner* — Gary J Portka
(74) *Attorney, Agent, or Firm* — Norton Rose Fulbright US LLP; Gerard Messina

(57) ABSTRACT

A method for operating a microcontroller, where access rights of processes executed in the microcontroller to different memory areas are stored in a memory protection unit, includes, in the course of a simulation mode, a first process carrying out an access attempt to a certain memory area in a certain manner in the name of a second process; the memory protection unit transferring access rights of the second process for the certain memory area to the first process upon the access attempt. The access rights are read out by the first process and the simulation mode is terminated. The access attempt is preferably thereupon terminated and an access is not carried out according to this access attempt by the first process.

12 Claims, 2 Drawing Sheets

(52) U.S. Cl.
CPC ...... *G06F 21/79* (2013.01); *G06F 2221/2141* (2013.01); *G06F 2221/2149* (2013.01)

(58) Field of Classification Search
USPC .................. 711/152, 163; 726/27, 29, 30
See application file for complete search history.

(56) References Cited

U.S. PATENT DOCUMENTS

| | | | |
|---|---|---|---|
| 2008/0184373 A1* | 7/2008 | Traut | G06F 9/45533 726/26 |
| 2011/0145531 A1 | 6/2011 | Kobayashi | |
| 2015/0067277 A1* | 3/2015 | Daito | G06F 9/468 711/152 |

\* cited by examiner

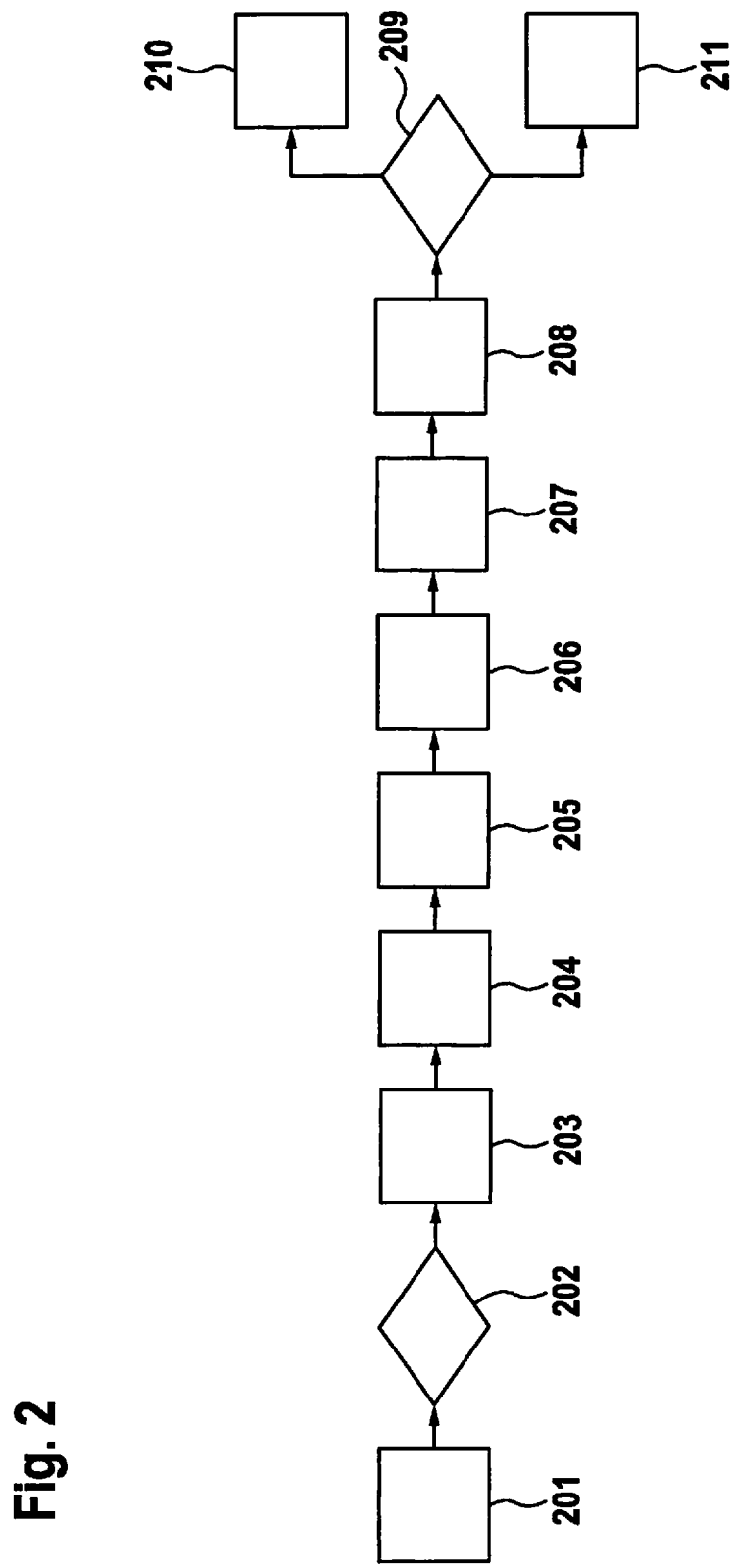

METHOD FOR OPERATING A MICROCONTROLLER

CROSS-REFERENCE TO RELATED APPLICATIONS

The present application is the national stage of International Pat. App. No. PCT/EP2016/076788 filed Nov. 7, 2016, and claims priority under 35 U.S.C. § 119 to DE 10 2015 223 335.9, filed in the Federal Republic of Germany on Nov. 25, 2015, the content of each of which are incorporated herein by reference in their entireties.

FIELD OF THE INVENTION

The present invention relates to relates to a method for operating a microcontroller and a processing unit and a computer program for carrying out the method.

BACKGROUND

Microcontrollers, for example, for embedded systems have, inter alia, a processor unit and a memory unit, such as ROM, RAM, flash, and/or EEPROM, having different memory areas. The processor unit can include one or multiple processor core(s), in each of which different processes (tasks, programs, computing instructions, etc.) can be executed. The executed processes can access the different memory areas.

An access protection or memory protection is of great significance for the operation of microcontrollers. With the aid of such an access or memory protection, an unauthorized access to the memory areas is to be prevented from taking place. Such a memory protection can be implemented, for example, by a special hardware component, the so-called memory protection unit (MPU).

SUMMARY

Example embodiments of the present invention are directed to a method for operating a microcontroller and a processing unit and a computer program for carrying out the method.

The microcontroller in particular includes a processor unit having one or multiple processor core(s) and a memory unit (e.g., ROM, RAM, flash, EEPROM) having different memory areas. Different processes (tasks, programs, computing instructions, etc.) are executed by the microcontroller or by the processor unit. The processes are in particular executed at different privilege levels or hierarchy levels. An operating system or operating software (BSW) in particular has a highest privilege level or a highest hierarchy level. Furthermore, different application software (ASW) can be executed, in each case having a lower privilege level than the operating system.

For security reasons, it is not permitted for all processes to access all memory areas in their entirety. Different processes are therefore in particular assigned different access rights, i.e., different processes can each access (or not access) individual memory areas ("where") to a different extent ("how"). Access rights of processes to memory areas can be reading, writing, and/or executing, for example.

Access rights (reading, writing, executing) of processes executed in the microcontroller to different memory areas (in particular characterized by a start address and an end address) in a memory protection unit are stored in the memory protection unit, i.e., the extent to which processes can access different memory areas is stored. Different processes or different parts of the application software can be differentiated, for example, by a thread ID or context ID.

The memory protection unit can be designed in particular as a hardware unit, in particular as a memory protection unit (MPU). It is also conceivable that the memory protection unit is executed as a process or as a software application, in particular having a highest privilege level.

In the course of a simulation mode or checking mode, a first process checks access rights of a second process to a certain memory area. For this purpose, the first process carries out an access attempt to a certain memory area in a certain way in the name of the second process. Following this access attempt, the memory protection unit transfers the access rights of the second process for the certain memory area to the first process. The memory protection unit can transfer the access rights, for example, by writing them into a suitable processor register of a processor executing the first process.

The access rights are read out by the first process and the simulation mode is terminated. The access attempt is preferably thereupon terminated and no access is carried out by the first process according to this access attempt. Access attempt is to be understood in this context to mean that an attempt is merely made to access the memory area or a certain address in the memory, but no actual access takes place.

A possibility is provided by the present invention of how a higher-privileged process, in particular the operating system, can learn the access rights of a lower-privileged process in a simple and rapid manner. In a conventional manner, this would take place in particular in software, for example, by the higher-privileged process identifying the access rights on the basis of tables or reading out and checking corresponding entries of the memory protection unit. This is mostly linked to a high runtime overhead. In contrast thereto, hardware-based checking of access rights of the lower-privileged process is enabled by the present invention, by the memory protection unit transferring the corresponding access rights for a certain memory address to the higher-privileged process.

For this purpose, a simulation of a memory access of the second process is carried out by the first process, which in particular is higher-privileged than the second process. The first process simulates in particular that the second process wishes to access a certain address in the memory, without this access actually taking place.

This can be implemented, for example, by the memory protection unit being switched over to the simulation mode and in this mode reacting to access attempts in a special manner. Alternatively or additionally, the first process can carry out the simulated access attempt with the aid of special simulation commands, to which the memory protection unit reacts differently than to conventional commands in the course of conventional access attempts. In both cases, the memory protection unit is in particular configured accordingly, to transfer the access rights of the second process to the first process in the course of the simulation mode.

The memory protection unit advantageously transfers the access rights of the second process to the first process in reaction to a read access by the first process, by the memory protection unit writing the access rights into a local memory, in which the result of a conventional (non-simulated) read access would be saved, in particular a register, of the processor core executing the first process. Therefore, in particular no additional local memory is utilized for the transfer of the access rights.

The first process preferably attempts to access the certain memory area for reading as an access attempt in the name of the second process. In particular, writing access attempts are not permitted during the simulation mode and trigger a trap in particular. A restriction to read accesses is advisable, since usually a data target in the processor which executes the first process is specified in the case of read access commands, such as a register of the processor. In the simulation mode, the actual datum of the read address is advantageously not written in this data target, but rather the corresponding access rights.

The simulation mode is preferably carried out by the memory protection unit being put into the simulation mode by way of a special start command. In particular, this start command is transmitted from the first process to the memory protection unit. After the first process has read out the access rights, the first process ends the simulation mode again in particular by transmitting a special end command to the memory protection unit.

Alternatively, after the start command, the memory protection unit can also be in the simulation mode for a defined number of access attempts, in particular for precisely one access attempt, or the start command contains as a parameter the number of access attempts which are to take place in the simulation mode. To prevent a suppression of memory accesses of a privileged process by a less privileged process, by the less privileged process putting the memory protection unit into the simulation mode, the possibility for switching over into the simulation mode can be restricted to processes having a minimum privilege level.

If the memory protection unit has been put into the simulation mode, the first process can carry out the access attempt with the aid of regular commands (for example, regular read or write commands). The memory protection unit reacts in this case in a special manner to these regular commands, however. In particular, the memory protection unit does not communicate with other components of the microcontroller via a corresponding communication system (e.g., bus, crossbar). For example, the memory protection unit can be put into the simulation mode and leave it again by way of a concrete command, a control register, an address bit, a thread ID, a software ID, and/or a context ID.

Alternatively or additionally, the simulation mode can preferably be carried out by carrying out the access attempt with the aid of a special access command (simulation command). In this case, regular commands are not used for the access attempt by the first process, but rather, for example, special read and/or write commands. The memory protection unit reacts to these special commands by not communicating with other components of the microcontroller, but rather transferring the access rights to the first process. In particular, only processes having a sufficiently high privilege level can execute simulation commands.

The simulation mode is advantageously carried out if the memory protection unit recognizes that the second process attempts to access the certain memory area in a manner which is not permitted thereto (for example, if the process wants write or execute access, but may only have read access). This access is in particular suppressed by the memory protection unit and the memory protection unit informs the first process, for example, with the aid of a trap. The memory protection unit thereupon carries out the simulation mode.

The first process decides whether the desired access of the second process is harmless and can be carried out or whether the access is to be stopped, for example, because an error of the second process or even an attack exists. The first process preferably makes this decision based on the access rights of the second process, which were read out with the aid of the simulation mode.

In a conventional manner, the first process would learn the access rights complexly with high runtime overhead, for example, by reading out and checking tables or corresponding entries of the memory protection unit. By contrast, the first process can check the access rights rapidly and with little effort and react rapidly to the access attempt of the second process by way of the present invention.

The memory protection unit is preferably designed as an MPU. The memory protection unit is preferably designed as a unit or module of the microcontroller and is in particular integrated into the microcontroller. The memory protection unit can preferably alternatively or additionally also be designed as an external unit or an external module, which is connected to the microcontroller, for example, via a bus or field bus system.

The first process advantageously has a higher privilege level than the second process. A lower-privileged process is thus prevented from being able to find out the access rights of a higher-privileged process. The first process is preferably the operating system.

The microcontroller is implemented in particular in a control unit of a motor vehicle, for example, in an engine control unit. Improved security of the corresponding control unit can thus be ensured and security requirements which are placed in the automotive field can be maintained. In particular, security requirements as listed in ISO norm 26262 can be maintained.

A processing unit according to the present invention, for example, a control unit of a motor vehicle, is configured, in particular by programming, to carry out a method according to the present invention.

The implementation of the method in the form of a computer program is also advantageous, since this involves particularly little cost, in particular if an executing control unit is still used for further tasks and is therefore present in any case. Suitable data carriers for providing the computer program are in particular magnetic, optical, and electrical memories, for example, hard drives, flash memories, EEPROMs, DVDs, etc. A download of a program via computer networks (Internet, intranet, etc.) is also possible.

Further advantages and embodiments of the present invention result from the description and the appended drawings, which schematically depict example embodiments described hereafter with reference to the drawings.

BRIEF DESCRIPTION OF THE DRAWINGS

FIG. 2 is a flowchart that illustrates a method according to an example embodiment of the present invention.

DETAILED DESCRIPTION

Figure 1A:
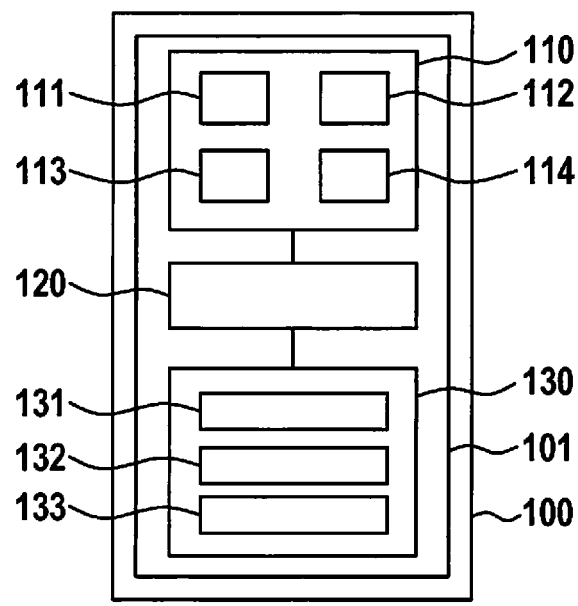
FIGS. 1a and 1b schematically show a control unit of a motor vehicle configured to carry out a a method according to example embodiments of the present invention.

FIG. 1a schematically shows a control unit 100 of a motor vehicle, for example, an engine control unit. Control unit 100 includes a microcontroller 101 having a processor unit 110, a memory protection unit 120 designed as a memory protection unit (MPU), and a memory unit 130 designed, for example, as a RAM memory.

A plurality of processes is executed in processor unit 110. Four executed processes 111, 112, 113, 114 are shown by way of example in FIG. 1a.

Process 111 is an operating system in this example, which has a highest privilege level, for example, four. Processes 112, 113, and 114 are tasks, for example, which are executed in the course of an engine control. Process 112 has, for example, a privilege level of three, process 113 has a privilege level of two, and process 114 has, for example, a privilege level of one.

RAM memory 130 includes a plurality of different memory areas. Three memory areas 131, 132, and 133 are shown by way of example in FIG. 1a.

Access rights of individual processes 111 through 114 are stored in MPU 120. Whether the particular process may access a special memory area for reading, writing, and/or executing are stored as access rights for each of processes 111 through 114.

Figure 1B:
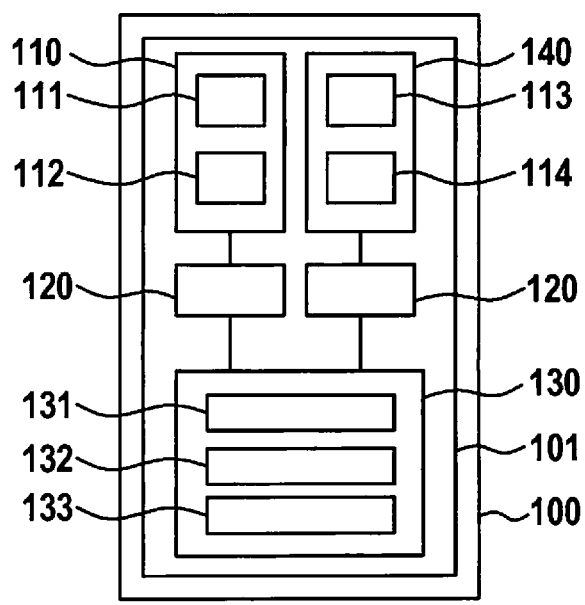

FIG. 1b shows another embodiment of a control unit 100. Identical or structurally-identical elements are provided with identical reference numerals in each of FIGS. 1a and 1b. Microcontroller 101 according to FIG. 1b includes a second processor core 140 in addition to processor core 110. In the example of FIG. 1b, processes 111 and 112 are executed by processor core 110 and processes 113 and 114 are executed by processor core 140. A separate MPU 120 is provided in each case for each of processor cores 110 and 140. RAM memory 130 is provided jointly for both processor cores 110 and 140.

The control unit according to each of FIGS. 1a and 1b is configured to carry out an example embodiment of a method according to the present invention, which is schematically shown as a block diagram in FIG. 2.

In step 201, process 113 wishes to access an address in memory area 132 for writing. MPU 120 thereupon checks the access rights of process 113 in step 202. For example, process 113 has a reading-only access right to memory area 132. MPU 120 therefore does not permit the access and informs the process having the highest privilege level, in this case operating system 111, with the aid of a trap in step 203.

Operating system 111 thereupon checks whether the access attempt of process 113 is permitted or indicates, for example, an attack or an error. For this purpose, operating system 111 checks the access rights of process 113. Operating system 111 puts MPU 120 into a simulation mode for this purpose in step 204, for example, by operating system 111 transmitting a special start command to MPU 120.

In step 205, the operating system executes a read access attempt to memory area 132 in the name of process 113. MPU 120, which is operated in the simulation mode, reacts to this access attempt by saving the access rights of process 113 in a local memory, in particular a register, of the executing processor core, in which memory the result of the read access is saved, in step 206.

In step 207, operating system 111 therefore has the access rights of process 113 provided in the local memory. In step 208, operating system 111 ends the simulation mode, for example, by transmitting an end command to MPU 120.

In step 209, operating system 111 decides based on the read-out access right whether the access attempt of process 113 is permitted or indicates, for example, an attack or an error.

If the access attempt is recognized as legitimate, operating system 111 carries out the corresponding write access itself, for example, in step 210. If the access attempt is not recognized as legitimate, for example, because there is an error of process 113, operating system 111 carries out corresponding measures in step 211. For example, operating system 111 can restart process 113.

What is claimed is:

1. A method for operating a microcontroller, wherein access rights of processes that are executable by the microcontroller for accessing a plurality of memory areas are stored in a memory protection unit, the method comprising:
   during a simulation mode of the memory protection unit:
      executing, by the microcontroller, a first one of the processes that carries out an attempt to access via the memory protection unit, on behalf of a second one of the processes and with a particular one of a plurality of access types, one of the plurality of memory areas, the second process being separate from the first process; and
      responsive to the access attempt, transferring, by the memory protection unit and to the first process, an indication of the access rights of the second process for the one of the plurality of memory areas;
      wherein the memory protection unit is a hardware unit, the hardware unit being a hardware memory protection unit, the hardware memory protection unit being separate from and external to the microcontroller.

2. The method of claim 1, wherein the access, whose attempt had been carried out, is not carried out in response to the attempt, and the simulation mode is terminated following the transfer.

3. The method of claim 1, wherein the access attempt is of a read access.

4. The method of claim 3, wherein the transfer includes writing of the indication of the access rights into a local memory of a processor core executing the first process, which local memory is specified as a target of the read access.

5. The method of claim 1, wherein the simulation mode is carried out by the memory protection unit being put into the simulation mode by a simulation start command.

6. The method of claim 1, wherein the simulation mode is carried out by the access attempt being carried out using a simulation access command.

7. The method of claim 1, further comprising initiating the simulation mode responsive to the memory protection unit recognizing that the second process attempts to access the one of the plurality of memory areas in a manner which is not permitted to the second process, the initiation including the memory protection unit informing the first process of the attempt by the second process.

8. The method of claim 7, further comprising the first process deciding based on the transferred indication of the access rights whether the attempted access by the second process can be executed.

9. The method of claim 1, wherein the first process has greater access rights to the plurality of memory areas than the second process.

10. The method of claim 1, wherein the memory protection unit is connected to the microcontroller.

11. A device comprising:
   a memory protection unit, the memory protection unit being a hardware unit and being a hardware memory protection unit; and
   a microcontroller configured to:
      execute a plurality of processes, wherein access rights of the processes for accessing a plurality of memory areas are stored in a memory protection unit; and
      during a simulation mode of the memory protection unit, execute a first one of the processes, which execution includes the first process carrying out an attempt to access via the memory protection unit, on behalf of a second one of the processes and with a particular one of a plurality of access types, one of the plurality of memory areas, wherein responsive to the access attempt, the memory protection unit transfers to the first process an indication of the access rights of the second process for the one of the plurality of memory areas, the first process being separate from the second process;

wherein the hardware memory protection unit is separate from and external to the microcontroller.

12. A non-transitory computer-readable medium on which are stored instructions that are executable by a processor and that, when executed by the processor, cause the processor to perform a method for operating a microcontroller, wherein access rights of processes that are executable by the microcontroller for accessing a plurality of memory areas are stored in a memory protection unit, the method comprising:

during a simulation mode of the memory protection unit:

executing a first one of the processes that carries out an attempt to access via the memory protection unit, on behalf of a second one of the processes and with a particular one of a plurality of access types, one of the plurality of memory areas, the first process being separate from the second process; and responsive to the access attempt, transferring by the memory protection unit to the first process an indication of the access rights of the second process for the one of the plurality of memory areas;

wherein the memory protection unit is a hardware unit, the hardware unit being a hardware memory protection unit, the hardware memory protection unit being separate from and external to the microcontroller.

* * * * *